United States Patent [19]

Matsuura et al.

[11] Patent Number: 5,256,176
[45] Date of Patent: Oct. 26, 1993

[54] FILM ELECTRET AND AN ELECTRET FILTER

[75] Inventors: Satoshi Matsuura; Yoshio Shinagawa, both of Kuga, Japan

[73] Assignee: Mitsui Petrochemical Industries, Ltd., Tokyo, Japan

[21] Appl. No.: 668,042

[22] Filed: Mar. 12, 1991

[30] Foreign Application Priority Data

Mar. 12, 1990 [JP] Japan .................................... 2-60705
Nov. 19, 1990 [JP] Japan .................................... 2-313182

[51] Int. Cl.$^5$ ....................... B01D 39/16; B01D 53/32
[52] U.S. Cl. ................................. 55/528; 55/DIG. 5; 55/DIG. 39; 204/165; 204/168; 264/22; 264/DIG. 8; 264/DIG. 48; 307/400; 369/144; 381/191
[58] Field of Search ................. 55/155, 528, DIG. 39, 55/DIG. 5, 103, 276, 101; 264/22, DIG. 8, DIG. 48; 204/165, 168; 307/400; 381/191; 369/144; 428/515, 516, 412, 500

[56] References Cited

U.S. PATENT DOCUMENTS

| 3,458,713 | 7/1969 | Perlman et al. | 55/DIG. 39 |
| 3,574,790 | 4/1971 | Young et al. | 55/DIG. 39 |
| 3,660,736 | 5/1972 | Igarashi et al. | 307/400 X |
| 3,793,715 | 2/1974 | Murayama et al. | 307/400 X |
| 3,924,324 | 12/1975 | Kodera | 29/592.1 |
| 4,178,157 | 12/1979 | Turnhout et al. | 55/155 |
| 4,375,718 | 3/1983 | Wadsworth et al. | 55/DIG. 39 |
| 4,513,049 | 4/1985 | Yamasaki et al. | 307/400 X |
| 4,789,504 | 12/1988 | Ohmori et al. | 55/DIG. 39 |
| 4,874,399 | 10/1989 | Reed et al. | 55/DIG. 39 |
| 4,874,659 | 10/1989 | Ando et al. | 55/DIG. 39 |
| 5,057,710 | 10/1991 | Nishiura et al. | 307/400 |

FOREIGN PATENT DOCUMENTS

| 0160497 | 11/1985 | European Pat. Off. . | |
| 56-10313 | 2/1981 | Japan | 55/DIG. 39 |
| 1337753 | 11/1973 | United Kingdom | 55/DIG. 39 |
| 2060259 | 4/1981 | United Kingdom | 55/DIG. 39 |

OTHER PUBLICATIONS

Patent Abstracts of Japan vol. 13, No. 408 (C-634)(3756) Sep. 8, 1989 & JP-A-1 148 320 (Toyobo Co Ltd) Jun. 9, 1989.

*Primary Examiner*—Richard L. Chiesa
*Attorney, Agent, or Firm*—Sherman and Shalloway

[57] ABSTRACT

A film electret and an electret filter that contain a polar high-molecular weight compound and that provides a TSDC curve having a homocharge peak temperature of at least 95° C. and a heterocharge peak temperature of at least 80° C.

20 Claims, 4 Drawing Sheets

F I G. 1
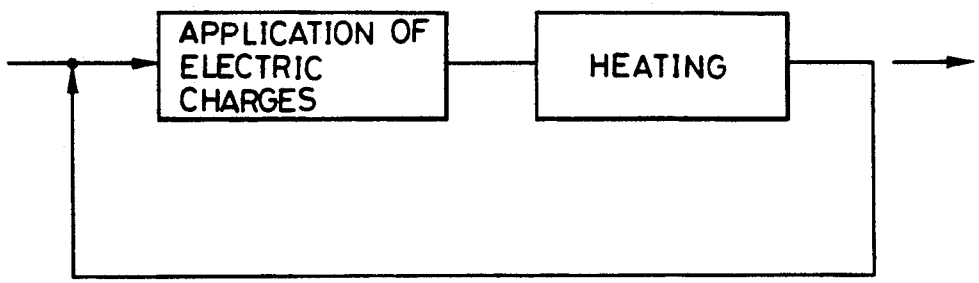
F I G. 2
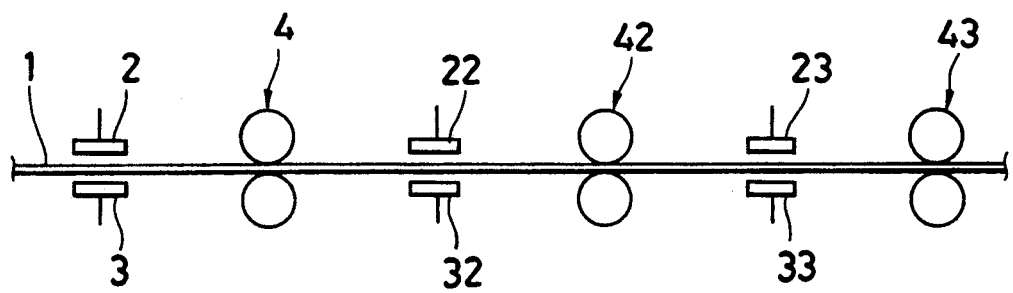

FILM ELECTRET AND AN ELECTRET FILTER

FIELD OF THE INVENTION

This invention relates to a process for producing an electret, as well as a film electret and an electret filter. More particularly, this invention relates to a process for producing an electret capable of prolonged retention of surface charges, as well as a film of resin electret that not only has surface charges at high density but also retains them consistently for a long period, and an electret filter that uses said resin film.

BACKGROUND OF THE INVENTION

Electrets in the form of a resin film or fabric sheet are used in various fields of application. Film electrets are used in acoustic devices such as microphones, speakers and cartridges, in devices in measuring instruments such as vibration meters and strain gages, and in contactless switches. Attempts are being made to extend the use of those films to memory devices and the medical area. On the other hand, sheets of fiber electret are used in dust collecting filters in home air conditioners, air cleaners, vacuum cleaners, etc., and in filters in industrial air conditioning equipment.

While various methods are known for making electrets, such as thermal electret, electroelectret, radioelectret, magnetoelectret, photoelectret and mechanical electret forming methods, the first two are currently employed in practice to make electrets out of resin films and fiber sheets, principally from the viewpoints of performance and cost. The thermal electret forming method is capable of yielding electrets that carry stable surface charges. However, this method is based on a batch system in which the starting material is first heated to a temperature above its melting or softening point and then cooled with a high DC voltage being applied. This is a time-consuming process and is not highly productive. On the other hand, the electroelectret forming method is highly productive since electrets are formed by injecting electric charges with high dc voltage being applied to the starting material at room temperature. However, the surface charges on the electrets are not highly stable.

Further, the films electrets made by the said conventional methods, as well as the electret filters prepared from those films have necessity to improve retention of surface charges.

SUMMARY OF THE INVENTION

A first object of the present invention is to provide a process by which electrets having high stability of surface charges can be manufactured at high production rate.

A second object of the present invention is to provide a film electret that not only has surface charges at high density but also retains them consistently for a long period, as well as an electret filter that uses said resin film.

The first object of the present invention can be attained by a process that includes the step of alternating continuously at least two, preferably at least three, cycles of applying electric charges to an article of interest and subsequently heating said article.

In its first embodiment, the present invention provides a process for producing a film electret by performing the above-specified step on a drawn or undrawn film.

In its second embodiment, the present invention provides a process for producing a sheet of fiber electret by performing the above-specified step on a woven or nonwoven fabric.

In its third embodiment, the present invention provides a process for producing an electret in the form of a nonwoven fabric by applying the above-specified step to a drawn or undrawn film and fibrillating the film into a fibrous state.

The second object of the present invention can be attained by a film electret that contains a polar high-molecular weight compound and that provides a TSDC (thermally stimulated depolarization current) curve having a homocharge peak temperature of at least 95° C. and a heterocharge peak temperature of at least 80° C.

The second object of the present invention can also be attained by an electret filter that is composed of fibers obtained by fibrillating the above-specified film electret.

BRIEF DESCRIPTION OF THE DRAWINGS

The accompanying drawings which are incorporated in and constitute a part of this specification, illustrate one embodiment of the invention and, together with the description, serve to explain the principles of the invention.

FIG. 1 is a flowchart illustrating the essential steps of the process for producing an electret according to the first aspect of the present invention;

FIG. 2 is a diagram showing an example of the process of the present invention which is implemented in a continuous manner;

DETAILED DESCRIPTION OF THE PREFERRED EMBODIMENT

Figure 3:
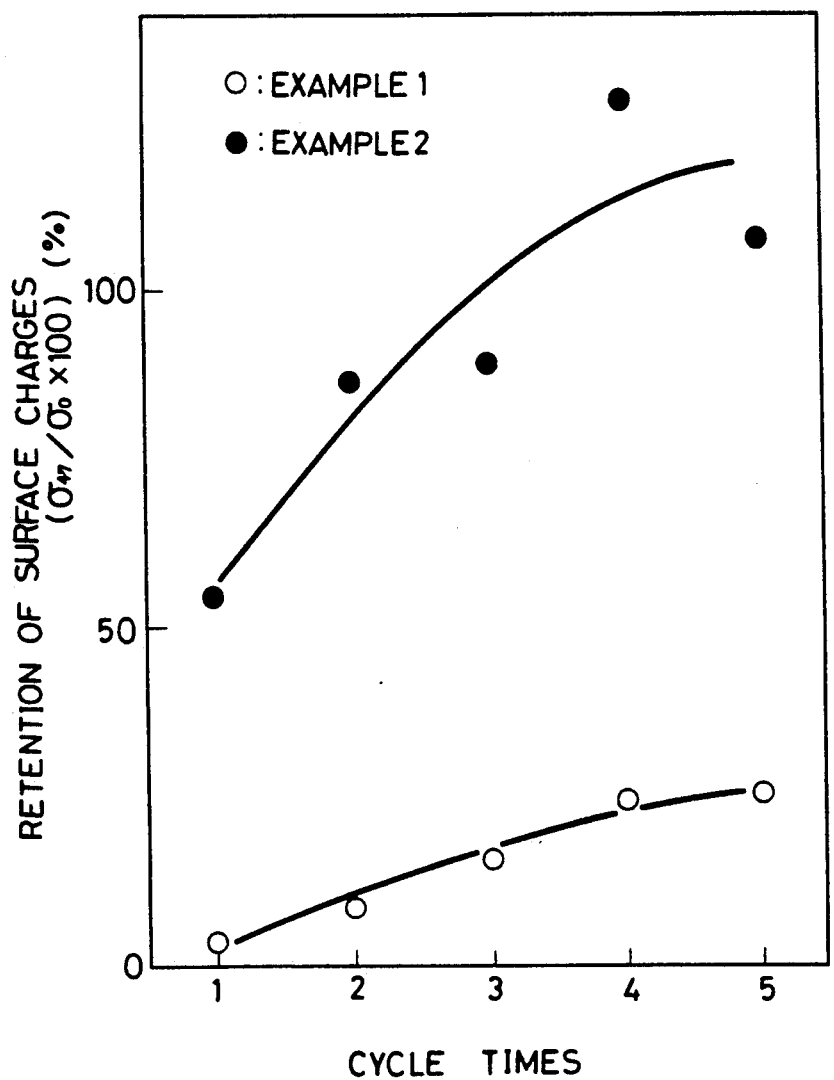
FIG. 3 is a graph showing the results of measurement of the retention of surface charge density in Example 1 and 2 of the present invention.

The preferred embodiment of the present invention is described below in detail.

As shown in FIG. 1, the process of the present invention for producing an electret is characterized by alternating at least two cycles applying electric charges to an article of interest and subsequently heating said article. The conditions charging to the article of interest and subsequently heating the same may be selected as appropriate in accordance with various factors including the melting point of the article to be treated, its morphology, the desired time and temperature of treatment. Typically, electric charges are applied by applying a DC voltage of ca. 5-20 kv to the article under treatment. The heat treatment is conducted at temperatures of ca. 60°-200° C. It is particularly preferred to select temperatures in the range from the melting point of the article being treated to the point 50° C. lower than that melting point since this contributes to the production of a stable electret. Appropriate conditions for charging and heating are selected as related to each other so that electrets having a desired surface charge density can be obtained at high production rate. Stated more specifically, if electric charges are applied at a temperature slightly lower than the melting point and transition point of the electret to be produced, heating may be performed for a short time.

If the article to be treated is a film, electric charges may be applied by passing the film between two electrodes across which a DC voltage is impressed. The film may be heated by passing it between heating rollers controlled at a predetermined temperature. In the process of the present invention, the step of alternating charging to the article of interest and subsequently heating said article is repeated at least twice, preferably three to five times.

The article to be treated by the method of the present invention is not limited to any type and it may assume any shape such as a film, sheet or fiber.

The article to be treated may typically be made of a material that is chiefly composed of a high-molecular weight compound. Specific examples of the material which is chiefly composed of a high-molecular weight compound include: a material that is solely composed of a nonpolar high-molecular weight compound; a composition comprising both a nonpolar high molecular weight compound and polar high-molecular weight compound; a material that is solely composed of a modified nonpolar high-molecular weight compound; a two-component composition comprising a nonpolar high-molecular weight compound and a modified nonpolar high-molecular weight compound; and a three-component composition comprising a nonpolar high-molecular weight compound, a polar high-molecular weight compound and a modified nonpolar high-molecular weight compound. The last mentioned two-component compositions and three-component compositions are preferred.

Any high-molecular weight compounds that have no polarity can be used as the "nonpolar high-molecular weight compound". Specific examples of the nonpolar high-molecular weight compound include: polyolefins such as polyethylene, polypropylene, polybutene-1, and poly(4-methyl-1-pentene); polystyrenes; and fluorine resins such as polytetrafluoroethylene. These nonpolar high-molecular weight compounds may be used either on their own or as admixtures.

Any high-molecular weight compounds that have polarity can be used as the "polar high-molecular weight compound". Exemplary polar high-molecular weight compounds are thermoplastic resins composed of high-molecular weight compounds that can be shaped in molten state and that contain in their molecule a polar group such as a carboxylic acid group, and ester group, and amido group, a hydroxyl group, and ether group, a nitrile group, a carbonyl group or a halogen atom. Specific examples of such thermoplastic resins include: polyesters such as polyethylene terephthalate and polytetramethylene terephthalate; polyamides such as nylon 6, nylon 66 and nylon 12; polycarbonates; acrylic resins such as polymethyl (meth)acrylate and polyethyl acrylate; acrylonitrile-styrene resins (AS resins), acrylonitrilebutadiene-styrene resins (ABS resins), polyvinyl chloride, polyvinylidene chloride, polychlorotrifluoroethylene, polyacetal and polyacrylonitrile. These polar high-molecular weight compounds may be used either on their own or as admixtures.

Examples of the "modified nonpolar high-molecular weight compound" include:

(A) a nonpolar high-molecular weight compound modified with an unsaturated carboxylic acid or a derivative thereof;

(B) a nonpolar high-molecular weight compound modified with an unsaturated epoxy compound; and (C) a nonpolar high-molecular weight compound modified with an organosilicon compound having an olefinically unsaturated bond.

These modified nonpolar high-molecular weight compounds may be used either on their own or as admixtures.

The modified nonpolar high-molecular weight compound (A) may be prepared by random or block copolymerization of an unsaturated carboxylic acid or a derivative thereof with the monomer of which the nonpolar high-molecular weight compound as the first component of the three-component composition is made, or by grafting an unsaturated carboxylic acid or a derivative thereof to said nonpolar high-molecular weight compound to form a copolymer.

Exemplary unsaturated carboxylic acids or derivatives thereof include: unsaturated carboxylic acids such as acrylic acid, methacrylic acid, α-ethylacrylic acid, maleic acid, fumaric acid, itaconic acid, citraconic acid, tetrahydrophthalic acid, methyltetrahydrophthalic acid, endo-cis-bicyclo[2,2,1]hept-5-ene-2,3-dicarboxylic acid (Nadic acid ®), and methyl-endo-cis-bicyclo[2,2,1]-hept-5-ene-2,3-dicarboxylic acid (Methylnadic acid ®); and derivatives of unsaturated carboxylic acids such as acid halides, amides, imides, acid anhydrides and esters of such unsaturated caboxylic acids. Specific examples of the derivatives of such unsaturated carboxylic acids include maleyl chloride, maleimide, maleic anhydride, citraconic anhydride, monomethyl maleate and dimethyl maleate. Among these, maleic anhydride is particularly preferred.

The modified nonpolar high-molecular weight compound (B) may be prepared by random or block copolymerization of an epoxy compound with the monomer of which the nonpolar high-molecular weight compound is made as in the case of the modified compound (A), or by grafting an epoxy compound to said nonpolar high-molecular weight compound to form a copolymer.

The epoxy compound is a compound that has at least one each of a polymerizable unsaturated bond and an epoxy group in the molecule. Exemplary epoxy compounds include unsaturated glycidyl esters represented by the general formula (I):

(I)

(where $R^1$ is a hydrocarbon group having a polymerizable ethylenically unsaturated bond); unsaturated glycidyl ethers represented by the general formula (II):

(II)

(where $R^1$ has the same meaning as defined for the formula (I); and X is a divalent group represented by $-CH_2-O-$ or

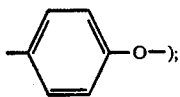

and epoxyalkenes represented by the general formula (III):

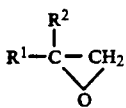

(where $R^1$ has the same meaning as defined for the formula (I); and $R^2$ is a hydrogen atom or a methyl group).

Specific examples of these epoxy compounds include: glycidyl acrylate, glycidyl methacrylate, mono- and diglycidyl esters of itaconic acid, mono-, di- and triglycidyl esters of butenetricarboxylic acids, mono- and diglycidyl esters of citraconic acid, mono- and diglycidyl esters of endo-cis-bicyclo[2,2,1]hept-5-ene-2,2-dicarboxylic acid (Nadic acid ®), mono- and diglycidyl esters of endo-cis-bicyclo[2,2,1]hept-5-ene-2-methyl-2,3-dicarboxylic acid (Methylnadic acid ®), mono- and diglycidyl esters of allylsuccinic acid, glycidyl esters of p-styrenecarboxylic acids, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, and vinylcyclohexene monooxide. Among these epoxy compounds, glycidyl acrylate and glycidyl methacrylate are preferred.

The modified nonpolar high-molecular weight compound (C) may be prepared by random, block or graft copolymerization of the nonpolar high-molecular weight compound with an organosilicon compound having an olefinically unsaturated bond as in the case of the modified compounds (A) and (B).

The organosilicon compound having an olefinically unsaturated bond is not limited to any particular type and may include one having not only an olefinically unsaturated bond but also a hydrolyzable organic group, as exemplified by those which are represented by the following general formulas (IV), (V) and (VI):

$$R^3 R^4 S_i Y^1 Y^2 \quad \text{(IV)}$$
$$R^3 X S_i Y^1 Y^2 \quad \text{(V)}$$
$$R^3 S_i Y^1 Y^2 Y^3 \quad \text{(VI)}$$

where $R^3$ and $R^4$ which may be the same or different are each a monovalent group that has an olefinically unsaturated bond and that contains at least one atom selected from among a carbon atom, a hydrogen atom and an oxygen atom, as exemplified by a vinyl group, an allyl group, a butenyl group, a cyclohexenyl group and a cyclopentadienyl group. A particularly preferred example is a terminal olefinically unsaturated group. Also preferred are those groups which have an ester bond of a terminal unsaturated acid, as exemplified by:

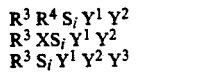

optimal example of $R^3$ and $R^4$ is a vinyl group. Represented by X in the formula (V) is an organic group having no olefinically unsaturated bond, as exemplified by monovalent hydrocarbon groups such as methyl, ethyl, propyl, tetradecyl, octadecyl, phenyl, benzyl and tolyl, and these groups may be substituted with halogens. In the formulas (IV), (V) and (VI), $Y^1$, $Y^2$ and $Y^3$ which may be the same or different each represents a hydrolyzable group, as exemplified by an alkoxy group or an alkoxyalkoxy group such as methoxy, ethoxy, butoxy or methoxyethoxy, an acyloxy group such as formyloxy, acetoxy or propionoxy, and oxime such as $-ON=C(CH_2)_2$, $-ON=CHCH_2C_2H_2$ or $-ON=C(C_2H_2)_2$, and a substituted amino group and an arylamino group such as $-NHCH_2$, $-NHC_2H_2$ or $-NH(C_2H_2)$.

Specific examples of the organosilicon compound include vinyltrisalkoxysilanes such as vinyltrimethoxysilane, vinyltriethoxysilane and vinyltris(methoxyethoxy)silane; vinylmethyldiethoxysilane and vinylphenyldimethoxysilane.

Various known methods may be adopted to produce the modified nonpolar high-molecular weight compounds (A), (B) and (C) by graft copolymerization. In one example, the nonpolar high-molecular weight compound to be modified is melted and, to the melt, the above described unsaturated carboxylic acid or derivative thereof, epoxy compound and/or organosilicon compound (these three types of compounds are hereunder collectively referred to as "modifying compounds") is added for graft copolymerization. In another example, the nonpolar high-molecular weight compound to be modified is dissolved in a suitable solvent and, to the solution, the modifying compound is added for graft copolymerization. In these methods, the reaction is preferably carried out in the presence of a radical generator since this permits the intended graft copolymerization to be performed in an efficient way. Exemplary radical generators that can be used include organic peroxide compounds, organic perester compounds and azo compounds. Radicals can also be generated by exposure to ionizing radiations, ultraviolet rays, etc. The graft ratio is typically such that the modifying compound is grafted in an amount of about 0.05-15 parts by weight, preferably about 0.05-10 parts by weight, to 100 parts by weight of the nonpolar high-molecular weight compound to be modified.

The three-component composition is preferred for use in the present invention. The relative contents of the nonpolar high-molecular weight compound, the polar high-molecular weight compound and the modified nonpolar high-molecular weight compound in the three-component composition are within the range of 60-99:0.5-39.5:0.5-20, preferably in the range of 80-95:1-10:4-10.

A preferred combination of the three components in the composition discussed above is that of polypropylene, polycarbonate and maleic anhydride modified polypropylene since the electret made from this combination has a high initial surface charge and prolonged charge retention is insured.

In addition to the three components described hereinabove, the composition may, if necessary, contain any of the additives that are customarily incorporated in compositions of the type under discussion, such as a heat stabilizer, a weathering agent, an inorganic or organic filler, a dye, a pigment, etc.

The interval at which the charging and the heating operation are alternated may be selected as appropriate for the article to be treated. The making of an electret by the process of the present invention is described below with reference to the case where the article to be treated is a continuous web such as a film or a sheet of woven or nonwoven fabric. As shown in FIG. 2, the article indicated by 1 is passed continuously through an apparatus comprising a sequence of a pair of electrodes 2 and 3 between which a DC voltage is applied, a heating roll 4, another pair of electrodes 22 and 32 between which a DC voltage is also applied, a heating roll 42, and a third pair of electrodes 23 and 33 between which a DC voltage is applied, and a subsequent heating roller 43. As a result, the charging and the heating operation are performed alternately through a predetermined number of cycles (three times in the case under discussion), whereby an electret is formed. Examples of the article that can be treated by the method of the present invention to form an electret include a film, a drawn film, a fibrous sheet article that is obtained by a process that comprises fibrillating a drawn film, cutting it into a predetermined size, opening the fibers, and shaping them into a sheet, as well as a nonwoven fabric sheet produced by known methods such as spun bonding and melt blowing. If desired, fibrous sheet articles may be subjected to thermal embossing, needle punching, ultrasonic fusion or some other processing and electrets can also be formed from these processed articles by the method of the present invention.

The process of the present invention is particularly advantageous for the purpose of producing a film electret. While various film electrets can be produced by this process, a film containing a polar high-molecular weight compound, in particular, a film that is composed of the above-discussed three-component composition and that has a peak temperature for homocharges of at least 95° C., preferably at least 120° C., and a peak temperature for heterocharges of at least 80° C. on a constructed TSDC (thermally stimulated depolarization current) curve is preferred.

The term "TSDC curve" as used herein means the profile of current that is produced when an electret film of interest that has an electrode at either one making a gap between the eletrode and electret surface, is heated at a constant rate of temperature elevation, with the electrode being connected to a high-sensitivity ammeter. The transfer of a charge followed by molecular motion and the change in the orientation polarization state is measured as a current. The current thus produced shows peaks in several temperature ranges. "Homocharges" comprise not only the electric charges that are injected from the electrode into the sample film but also the charges injected into the film as a result of ionization of the air between the electrode and the film by corona discharge. Accordingly, the homocharges in the film have the positive polarity on the surface facing the anode, and the negative polarity on the surface facing the cathode. "Heterocharges" differ from homocharges in that they have a polarity of opposite sign to the associated electrode and that they are generated as a result of orientation of permanent dipoles in the electret and both microscopic and macroscopic displacements of ions.

The film electret can be produce by shaping the material containing the aforementioned three-component composition or more into a film in the usual manner, and subjecting the film, either remaining undrawn or after being drawn, to the step of alternating at least two, preferably at least three, cycles of applying electric charges to the film and subsequently heating it. The composition may be shaped into a film by various methods such as melt extrusion through an extruder, inflation molding, and molding through a T die.

The voltage to be impressed for charging varies with the material of the film, its thickness, the shape of electrodes, the distance between electrodes, and other factors. To take, for example, the case where the distance between electrodes is 10 mm, a voltage of at least 5 kV, preferably in the range of 10–15 kV, may be applied to the film. Charging can be performed in the following various ways: passing the film between a pair of electrodes across which a DC voltage is impressed; applying corona discharge or pulsive high voltage to the surface of the film; applying a DC high voltage to both sides of the film as they are supported on another dielectric; and applying voltage under illumination with light.

After the charging, the film is heated to a temperature of about 60 to about 200° C. Heating is preferably performed at temperatures within the range from the melting point of the composition of which the film is composed to the temperature 50° C. below said melting point because by so doing, trapped charges tend to move to a more stable trap source, thereby making it possible to form a very stable electret. The heat treatment on the film may be performed by passing it between heating rollers or through an oven at a controlled temperature.

The thickness of the film electret to be produced by the present invention may be selected as appropriate for the specific use of the film and is not limited to any particular value. However, the thickness of that film is typically in the range of from about 5 to about 100 $\mu$m, preferably in the range of 10–30 $\mu$m.

The film electret thus produced may be used, as it is, in various fields of application, for example, as materials for acoustic devices such as microphones, pickups and speakers, in electrophotographic copying and printing areas, and as medical materials, in particular medical devices that are to be used in contact with the blood.

The present invention also provides an electret filter that is produced by fabricating the above-discussed film of resin electret. To make the filter, the film electret is first fibrillated and optionally cut to shorter lengths and the resulting fibers are opened, carded and otherwise processed by known techniques to be shaped into a sheet. The fibers of which the electret filter is made usually have a fineness of ca.2–15 denier, preferably ca.4–6 denier.

The area density of the electret filter is properly selected in accordance with various factors such as its use and the required ability to collect dust particles. Usually, the filter has an area density of ca.10–30 g/m$^2$, with the range of ca.20–100 g/m$^2$ being preferred.

The electret filter can be used in various applications not only as filters for home and office air conditioners, air cleaners, vacuum cleaners and fan heaters, but also as filters for air conditioning in industrial areas.

EXAMPLES

The following examples are provided for the purpose of further illustrating the present invention but it should of course be understood that they are by no means intended to limit the scope of the present invention.

EXAMPLE 1

Polypropylene films (B-200 of Mitsui Petrochemical Industries, Ltd.) having a thickness of 30 $\mu$m were passed between a pair of electrodes under application of a DC voltage of 10 kV at room temperature. Subsequently, the films were heated in an oven at 60° C., 80% R.H. for 48 h. The step of charging followed by heating treatment was repeated several times to form electret films. The density of surface charge ($\sigma_{48}$) on the films was measured after respective cycles of heat treatment by the method to be described below. For each electret film, the retention of surface charge density was determined by calculating $\sigma_{48}/\sigma_0 \times 100(\%)$, where $\sigma_0$ is the surface charge density measured after the first charging. The results are shown graphically in FIG. 3, with the retention of surface charge density being plotted on the vertical axis and the number of cycle times on the horizontal axis.

Measurement of Surface Charge Density

Figure 4:
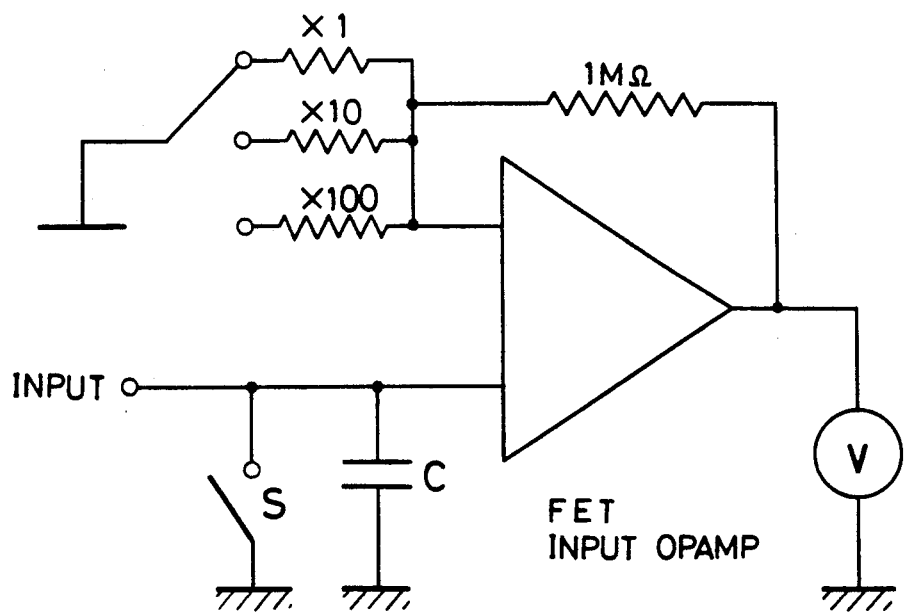
FIG. 4 is a circuit diagram for the apparatus used in the measurement of surface charge density.

A sample was set on the grounded flat metal plate in a surface charge density measuring apparatus having the circuit shown in FIG. 4 and the potential V that developed when an electrode of a given area was brought into contact with the surface of the sample was read. The surface charge density $\sigma$ can be determined by the following equation:

$$\sigma = Q/A = CV/A \text{ (coulomb/cm}^2\text{)}$$

where
C: capacitance;
A: the area of electrode; and
C: the quantity of charges in coulombs.

Electret films were prepared as in Example 1 except that the polypropylene films were replaced by films 30 μm thick, each of which was formed of a polypropylene composition that was a 90:5:5 mixture of polypropylene (B-200), polypropylene 3 wt % modified with maleic anhydride, and polycarbonate. The retention of surface charge density on each electret film was measured and its profile against the number of cycle times is shown graphically in FIG. 3.

EXAMPLE 3

Recipe of polymer composition:

| | |
|---|---|
| Polypropylene [homopolypropylene with MFR (ASTM D 1238) of 0.5 g/10 min and density of 0.91 g/cc] | 90% |
| Polypropylene modified with maleic anhydride | 5% |
| Polycarbonate | 5% |

Pellets of this polymer composition were supplied into an extruder (screw diameter, 40 mm), melted at 250° C. and shaped into films having a thickness of 30 μm.

Charges were applied to the films by passing them between a pair of electrodes at a DC voltage of −9 kV and subsequently the films were heated in an oven at 120° C. for 10 min. The step of charging and subsequent heat treatment was repeated 5 times to prepare films of resin electret.

Figure 5:
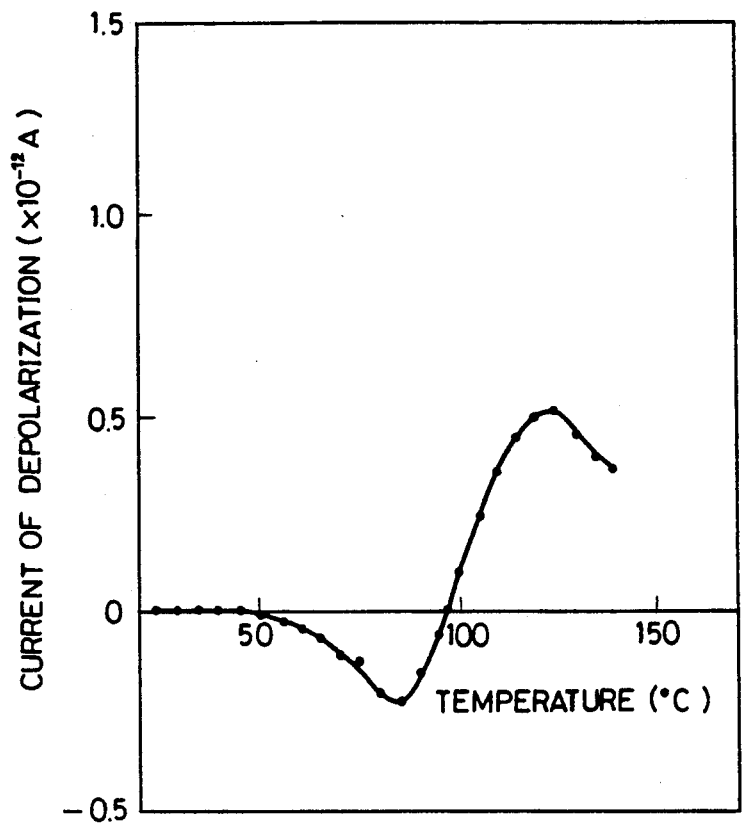
FIG. 5 is a graph showing the TSDC curve of the film of resin electret prepared in Example 3 of the present invention.

A TSDC curve was constructed for these film electrets by the method to be described below and the results were as shown in FIG. 5. The peak temperature for homocharges was 135° C. and that for heterocharges was 85° C.

Additional samples of electret films were prepared in the same manner as described above and their initial surface charge density and the retention of surface charges were evaluated by the method described below. The initial surface charge density $\sigma$ was $25.6 \times 10^{-9}$ C/cm$^2$, and the retention of surface charges after exposure to 60° C. $\times$ 80% R.H. for 24 h was 80%.

Construction of TSDC Curve

A thin gold film was vapor-deposited on one side of a sample film (30 μm thick), which was set on one of the two electrodes in a TSDC measuring instrument of Toyo Seiki K. K. A Teflon ring 1 mm thick was placed on the other side of the film and coupled to the other electrode (this method may be called a "contactless" technique).

The two electrodes were connected to a high-sensitivity ammeter and the values of current of depolarization that flowed when the sample was heated at a temperature increase rate of 3° C./min were measured.

Retention of Surface Charges

An electrified film was placed in a thermostatic vessel held at 60° C. and 80% R.H. and the initial and 24-h values of surface charge density were measured. On the basis of the two measured values, the retention of surface charges was calculated by the following equation:

Retention of surface charges =

$$\frac{\text{Surface charge density after 24 h}}{\text{Initial surface charge density}} \times 100(\%)$$

The surface charge density measurement was conducted with a tester of electrostatic induction type designed and manufactured by the Institute of Physical and Chemical Research, Japan.

EXAMPLE 4

The film electret prepared in Example 3 was drawn uniaxially by a degree of 6.6%, fibrillated with needle-studded rollers and would up on a takeup drum. Then, the fibers were cut to a length of 90 mm, opened to become fluffy and needle-punched to make an electret filter having a thickness of 2 mm and an areal density of 100 g/m$^2$.

To evaluate the performance of this filter, the efficiency of dust collection (E) and pressure loss (ΔP) were determined and the results were as follows: E=70.6%; ΔP=2.3 mmH$_2$O.

EXAMPLE 5

Films of resin electret were prepared as in Example 3 except that the polymer composition was replaced by polypropylene (MFR, 0.5 g/10 min; density, 0.91 g/cc).

Figure 6:
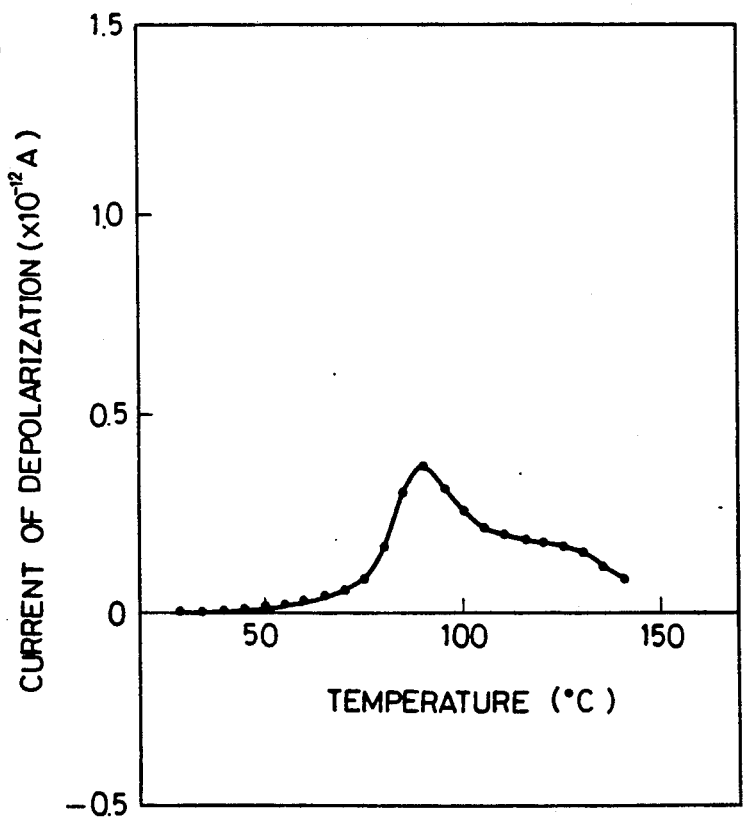
FIG. 6 is a graph showing the TSDC curve of the film of resin electret prepared in Example 5.

A TSDC curve was constructed for those films as in Example 3 and the results were as shown in FIG. 6. The peak temperature for homocharges was 80° C. but there was no detectable peak for heterocharges. The initial surface charge density o was $20.3 \times 10^{-9}$ C/cm$^2$ and the retention of surface charges was 16%.

EXAMPLE 6

An electret filter was fabricated as in Example 4 except that the polymer composition was replaced by the same polypropylene as used in Comparative Example 1. The results of evaluation of the filter performance were as follows: E=48%; ΔP=3.1 mmH$_2$O.

The film electret produced by the process described hereinabove not only has surface charges at high density but also retain them consistently for a long period. Hence, this film is capable of exhibiting its intended performance in a consistent manner for a longer period than the conventional films of resin electret. Further, the electret filter fabricated from this film has high retention of surface charges and hence is capable of exhibiting the intended performance such as efficient dust collection in a consistent manner over a prolonged period of time.

What is claimed is:

1. A film of resin electret that comprises a three-component composition comprising a nonpolar high-molecular weight compound, a polar high-molecular weight compound and a modified high-molecular weight compound, and that provides a TSDC curve having a homocharge peak temperature of at least 95° C. and a heterocharge peak temperature of at least 80° C.

2. A film of resin electret according to claim 1 wherein the relative proportions of the nonpolar high-molecular weight compound, the polar high-molecular weight compound and the modified nonpolar high-molecular weight compound in said three-component composition are within the range of 60–99:0.5–39.5:0-.5–20 in weight ratio.

3. A film of resin electret according to claim 1 wherein said three-component composition consists essentially of the combination of polypropylene, polycarbonate, and polypropylene modified with maleic anhydride.

4. An electret filter comprising fibrillated fibers of the film of resin electret according to claim 1.

5. A film of resin electret that comprises a three-component composition consisting essentially of a nonpolar high-molecular weight polypropylene compound, a polar high molecular weight polycarbonate compound and a polypropylene modified with maleic anhydride, wherein the relative proportions of each are within the range of 60–99:0.5–39.5:0.5–20 in weight ratio, and that provides a TSDC curve having a homocharge peak temperature of at least 95° C. and a heterocharge peak temperature of at least 80° C.

6. A film of resin electret according to claim 5 wherein the relative proportions of the nonpolar high molecular weight compound, the polar high-molecular weight compound and the modified nonpolar high-molecular weight compound in said three-component composition are within the range of 80–95:1–10:4–10.

7. A film of resin electret according to claim 5 wherein the film provides a TDSC curve having a homocharge peak temperature of at least 120° C. and a heterocharge peak temperature of at least 80° C.

8. A film electret according to claim 5 wherein the film has a thickness of 5 to 100 μm.

9. An electret filter comprising fibrillated fibers of the film of resin electret according to claim 5.

10. A film 5 to 100 μm thick of resin electret that comprises a three-component composition consisting essentially of a nonpolar high-molecular weight polypropylene compound, a polar high molecular weight polycarbonate compound and a polypropylene modified with maleic anhydride, wherein the relative proportions of each are within the range of 80–95:1–10-:4–10 weight ratio, and that provides a TSDC curve having a homocharge peak temperature of at least 120° C. and a heterocharge peak temperature of at least 80° C.

11. An electret filter comprising fibrillated fibers comprising a three-component composition consisting essentially of a nonpolar high-molecular weight polypropylene compound, a polar high molecular weight polycarbonate compound and a polypropylene modified with maleic anhydride, wherein the relative proportions of each are within the range of 80–95:1–10-:4–10 in weight ratio, and that provides a TSDC curve having a homocharge peak temperature of at least 120° C. and a heterocharge peak temperature of at least 80° C.

12. A film of resin electret prepared by the steps of alternating at least two cycles of applying an electric charge to the film and subsequently heating the film, wherein the film comprises a three-component composition comprising a nonpolar high-molecular weight compound, a polar high-molecular weight compound and a modified high-molecular weight compound, and that provides a TSDC curve having a homocharge peak temperature of at least 95° C. and a heterocharge peak temperature of at least 80° C.

13. The film of resin electret according to claim 12 wherein the film is drawn or undrawn film.

14. The film of resin electret according to claim 12 wherein the relative proportions of the nonpolar high-molecular weight compound, the polar high-molecular weight compound and the modified nonpolar high-molecular weight compound in the three-component composition are within the range of 60–99:0.5–39.5:0-.5–20 in weight ratio.

15. The film of resin electret according to claim 12 wherein relative proportions of the nonpolar high-molecular weight compound, the polar high-molecular weight compound and the modified nonpolar high-molecular weight compound in the three-component composition are within the range of 80–95:1–10:4–10 in weight ratio.

16. The film of resin electret according to claim 12, that provides a TSDC curve having a homocharge peak temperature of at least 120° C. and a heterocharge peak temperature of at least 80° C.

17. The film of resin electret according to claim 12 wherein the three-component composition consists essentially of the combination of polypropylene, polycarbonate, and polypropylene modified with maleic anhydride.

18. The film of resin electret according to claim 12, that has a thickness of 5 to 100 μm.

19. An electret filter comprising fibrillated fibers of the film of resin electret according to claim 12.

20. A film of resin electret prepared by the steps of alternating three to five cycles of applying an electric charge to the film and subsequently heating the film, wherein the film comprises a three-component composition consisting essentially of a nonpolar high-molecular weight polypropylene compound, a polar high-molecular weight polycarbonate compound and a polypropylene modified with maleic anhydride, wherein the relative proportions of each are within the range of 80–95:1–10:4–10 in weight ratio, and that provides a TSDC curve having a homocharge peak temperature of at least 120° C. and a heterocharge peak temperature of at least 80° C.

* * * * *